United States Patent [19]

Ngai et al.

[11] Patent Number: 4,967,343
[45] Date of Patent: Oct. 30, 1990

[54] PIPELINED PARALLEL VECTOR PROCESSOR INCLUDING PARALLEL CONFIGURED ELEMENT PROCESSORS FOR PROCESSING VECTOR ELEMENTS IN PARALLEL FASHION

[75] Inventors: Chuck H. Ngai; Edward R. Wassel, both of Endwell; Gerald J. Watkins, Endicott, all of N.Y.

[73] Assignee: International Business Machines Corp., Armonk, N.Y.

[21] Appl. No.: 530,842

[22] Filed: Sep. 9, 1983

Related U.S. Application Data

[63] Continuation-in-part of Ser. No. 495,563, May 18, 1983, Pat. No. 4,630,192.

[51] Int. Cl.[5] ............................................. G06F 15/16
[52] U.S. Cl. ............................. 364/200; 364/232.21;
364/736
[58] Field of Search .................. 364/748, 200 MS File,
364/900 MS File

[56] References Cited

U.S. PATENT DOCUMENTS

| 4,041,461 | 8/1977 | Kratz et al. | 364/200 |
|---|---|---|---|
| 4,101,960 | 7/1978 | Stokes et al. | 364/200 |
| 4,171,536 | 10/1979 | Heuer et al. | 364/200 |
| 4,179,734 | 12/1979 | O'Leary | 364/200 |
| 4,287,566 | 9/1981 | Culler | 364/754 |
| 4,435,765 | 3/1984 | Uchida et al. | 364/200 |
| 4,490,786 | 12/1984 | Nakatani | 364/200 |
| 4,594,655 | 6/1986 | Hiro et al. | 364/200 |
| 4,617,625 | 10/1986 | Nagashima et al. | 364/200 |
| 4,621,324 | 11/1986 | Ushiro et al. | 364/200 |

FOREIGN PATENT DOCUMENTS

0053457 6/1982 European Pat. Off. .

OTHER PUBLICATIONS

"The Architecture of Pipelined Computers", by Peter M. Kogge, 1981, p. 207.
IBM Technical Disclosure Bulletin, "Parallel Table Directed Translation", T. C. Chen et al., vol. 22, No. 6, Nov. 1979, pp. 2489-2490.
IBM 2938 Overall Data Flow Chart with Arithmetic Section Data Flow, dated 2/69.

Primary Examiner—Lawrence E. Anderson
Attorney, Agent, or Firm—John H. Bouchard

[57] ABSTRACT

A pipelined parallel vector processor is disclosed. In order to increase the performance of the parallel vector processor, the present invention decreases the time required to process a pair of vectors stored in a pair of vector registers. The vector registers are subdivided into a plurality of smaller registers. A vector, stored in a vector register, comprises N elements; however, each of the smaller registers store M elements of the vector, where M is less than N. An element processor, functioning in a pipeline mode, is associated with each smaller register for processing the M elements of the vectors stored in the smaller register and generating results of the processing, the results being stored in one of the vector registers. The smaller registers of the vector registers, and their corresponding element processors, are structurally configured in a parallel fashion. The element processors and their associated smaller registers operate simultaneously. Consequently, processing of the N element vectors, stored in the vector registers, is complete in the time required to complete the processing of the M elements of the N element vector.

8 Claims, 4 Drawing Sheets

PIPELINED PARALLEL VECTOR PROCESSOR INCLUDING PARALLEL CONFIGURED ELEMENT PROCESSORS FOR PROCESSING VECTOR ELEMENTS IN PARALLEL FASHION

CROSS REFERENCE TO RELATED APPLICATIONS

The application is a continuation-in-part of application Ser. No. 495,563, filed May 18, 1983, now U.S. Pat. No. 4,630,192. This application is distinguishable from application Ser. No. 495,563, in that the former claims an apparatus for rapidly processing a pair of vectors and storing the results of the processing whereas the latter claims an apparatus for executing an instruction and for simultaneously generating and storing related information.

BACKGROUND OF THE INVENTION

The present invention pertains to a computer system, and more particularly, to a parallel vector processor in said computer system for rapidly processing a pair of vectors and storing the results of said processing.

A typical vector processor, such as the vector processor shown in FIG. 1, includes a plurality of vector registers, each vector register storing a vector. The vector comprises a plurality of vector elements. A pipeline processing unit is connected to a selector associated with the vector registers for receiving corresponding elements of a first vector from a first vector register and utilizing the corresponding elements to perform an arithmetic operation on the corresponding elements of a second vector stored in a second vector register. The results of the arithmetic operation are stored in corresponding locations of one of the vector registers, or in corresponding locations of a third vector register.

However, with this configuration, it is necessary to perform operations on each of the corresponding elements of the vectors in sequence. If the vectors include 128 elements, 128 operations must be performed in sequence. The time required to complete operations on all 128 elements of the vector is a function of the cycle time per operation of the pipeline unit as is operates on each of the corresponding elements.

As a result of increasing sophistication of computer systems, there is a need to increase the performance of the vector processor portion of the computer system by decreasing the time required to process or perform arithmetic operations on each of the corresponding elements of a plurality of vectors stored in the vector registers within the computer system.

SUMMARY OF THE INVENTION

Accordingly, it is a primary object of the present invention to increase the performance of the vector processor portion of a computer system by decreasing the time required to process the corresponding elements of the vectors stored in a plurality of vector registers comprising said vector processor portion of the computer system.

It is a further object of the present invention to increase the performance of the vector processor portion of the computer system by subdividing the plurality of vector registers into a plurality of smaller registers, and processing each of the elements of the smaller registers in parallel with one another.

These and other objects are accomplished, in accordance with the present invention, by reducing the time required to complete processing operations on all elements of the vector. The vector registers are subdivided into a plurality of smaller registers, each of which store, for example, four elements of a 128 element vector. An element processor is associated with each smaller register, the element processor performing the same function as the pipeline processing unit. Each element processor, and corresponding smaller register, is connected in parallel fashion with respect to other element processors and their corresponding smaller registers. With this configuration, when an arithmetic operation is performed with respect to a first and second vector, the arithmetic operation, performed on all of the elements of the vector (for example, all 128 elements), is completed in the time required to complete an arithmetic operation on, in this example, four corresponding elements of the vectors. As a result, the performance of a vector processor is improved substantially as a result of a utilization of the concepts of the present invention.

Further scope of applicability of the present invention will become apparent from the text presented hereinafter. It should be understood, however, that the detailed description and the specific examples, while representing a preferred embodiment of the invention, are given by way of illustration only, since various changes and modifications within the spirit and scope of the invention would become obvious to one skilled in the art as a result of a reading of the following detailed description.

BRIEF DESCRIPTION OF THE DRAWINGS

A full understanding of the present invention will be obtained from a reading of the detailed description given hereinbelow and the accompanying drawings, which are given by way of illustration invention, and wherein.

DETAILED DESCRIPTION OF THE PREFERRED EMBODIMENT

Figure 1:
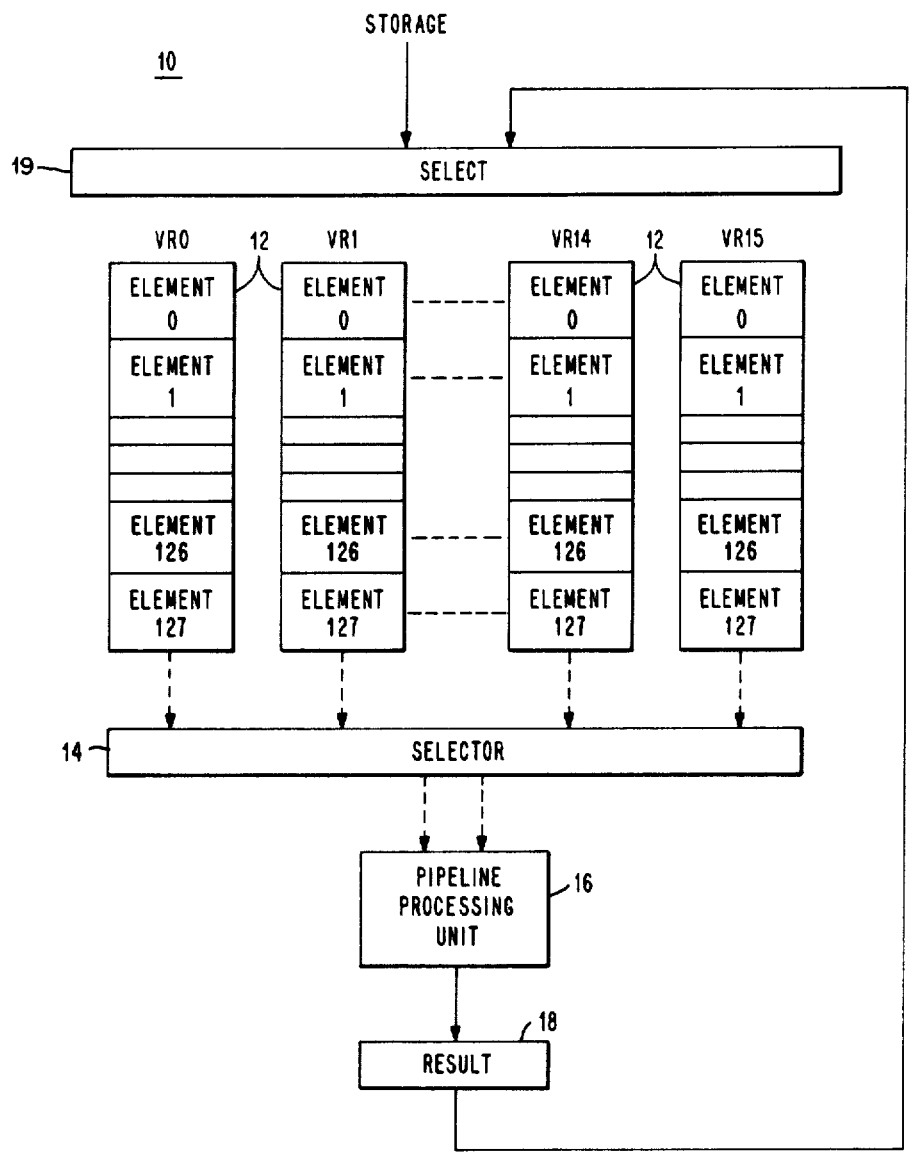
FIG. 1 illustrates a conventional vector processor.

Referring to FIG. 1, a pipeline vector processor 10 is illustrated. In FIG. 1, a plurality of vector registers 12 (VR0 through VR15) are shown, each register storing 128 elements (element 0 through element 127). In the preferred embodiment, an element comprises a four (4) byte binary word. A selector 14 is connected to each of the vector registers 12 for selecting corresponding elements from the vector registers 12 and gating the selected elements through to a pipeline processing unit 16. The pipeline processing unit 16 is connected to the selector for receiving the corresponding elements and for performing selected operations on said elements, such as arithmetic operations. For example, the processing unit 16 may receive element 0 from vector register VR0 and corresponding element 0 from vector register VR15 and perform the following arithmetic operation on said elements: VR0+VR15→VR3. In this arithmetic operation, each of the binary bits of element 0 in VR0 is added to each of the binary bits of element 0 in VR15, and the resultant sum is stored in the element 0 position of vector register VR3. A result register 18 is connected to the pipeline processing unit for storing the resultant sum received from the pipeline processing unit. The result register 18 is connected to each of the vector registers 12 via a select gate 20 for transferring the resultant sum from the result register 18 to vector register VR3.

The configuration illustrated in FIG. 1 possesses certain disadvantages. Utilizing the example, a first element is selected from register VR0 and a corresponding element is selected from register VR15. The elements are added in the above manner. A second element is selected from registers VR0 and VR15 and are added together in the above manner. Each of the 128 elements must be selected from registers VR0 and VR15 and added together, in sequence, in order to complete the processing of the vectors stored in vector registers VR0 and VR15. As a result, the time required to complete the processing of the vectors stored in vector registers VR0 and VR15 is a function of the number of elements per vector and the cycle time required to process a set of corresponding elements per vector. The performance of a vector processor could be improved by decreasing the time required to process a pair of vectors stored in a set of vector registers.

Figure 2:
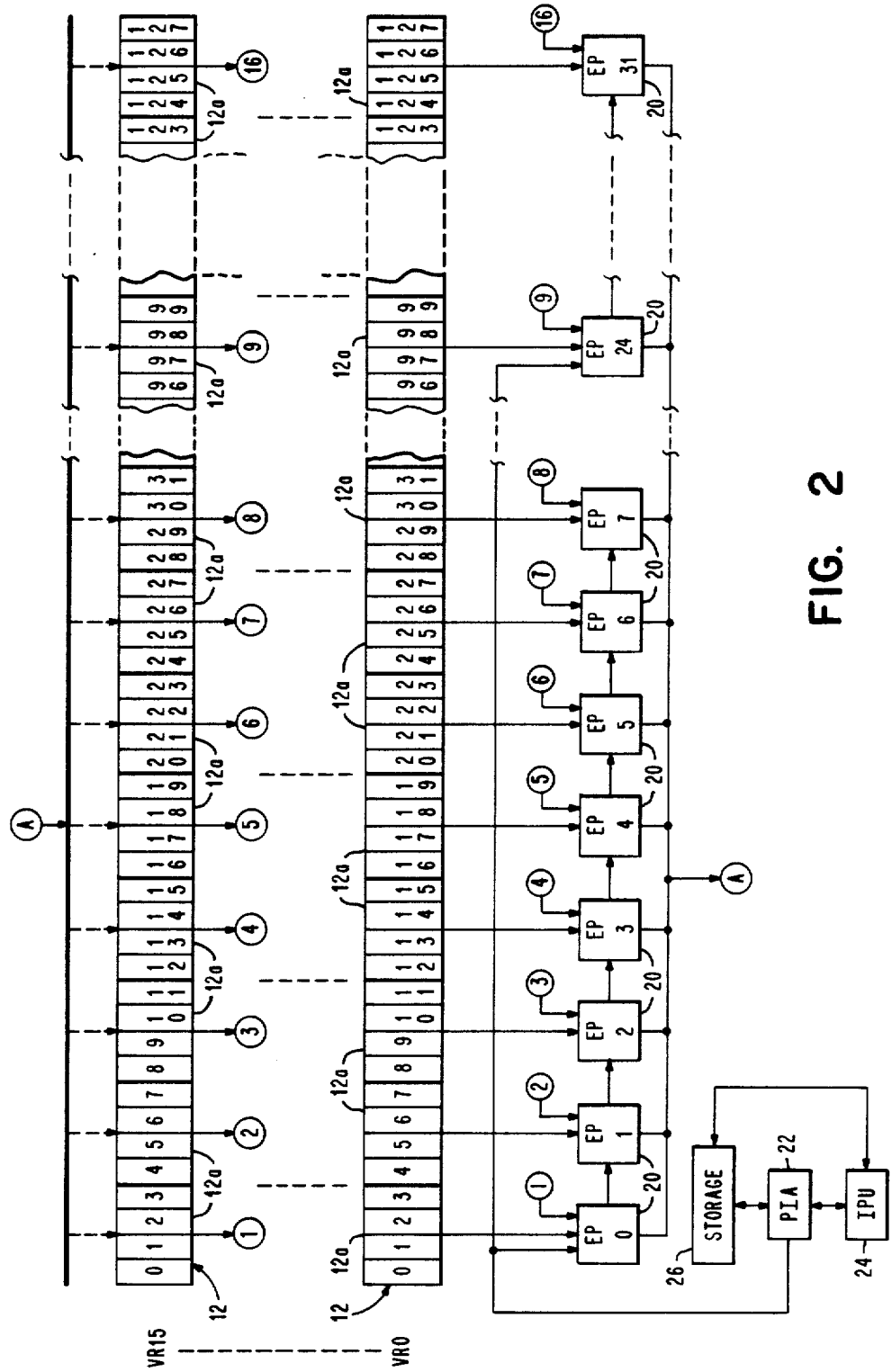
FIG. 2 illustrates the parallel vector processor of the present invention.
Figure 3:
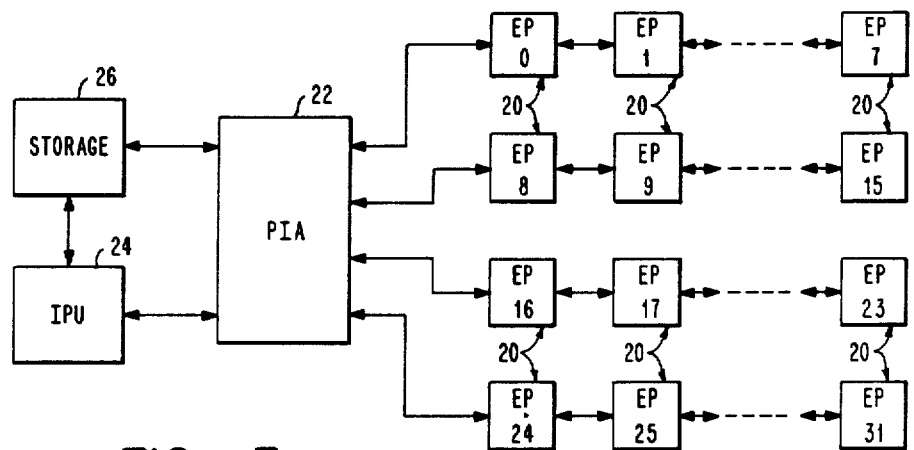
FIG. 3 illustrates the connection of the Processor Interface Adaptor to each of the element processors of FIG. 2.

Referring to FIG. 2, a parallel vector processor according to the present invention is illustrated. In FIG. 2, each of the vector registers VR0 through VR15 of FIG. 1 are subdivided into a plurality of smaller registers 12a, each smaller register 12a containing, for example, four elements. A corresponding plurality of element processors 20 are connected to the plurality of smaller registers 12a for performing processing (arithmetic) operations on the corresponding elements of the vectors stored in vector register VR0 through VR15, each of the element processors 20 performing processing operations on four corresponding elements of said vectors. The results of the processing operation are simultaneously produced by each element processor, in parallel, and may be stored in corresponding locations of any one of the vector registers VR0 through VR15. A processor interface adaptor (PIA) 22 is connected to each of the element processors 20 for transmitting address, data, and command information to each of the element processors. The actual connection of the PIA 22 to each of the element processors 0-31 is illustrated in FIG. 3 of the drawings. An instruction processing unit (IPU) 24 is connected to the PIA 22 for transmitting vector instructions to the PIA 22. A main memory or storage 26 is connected to the PIA 22 for transmitting the data information and address control information to the PIA in response to its request for such data.

Referring to FIG. 3, the actual connection of the PIA 22 to each of the element processors 20 (processor 0 through processor 31) is illustrated. The PIA 22 is connected to element processors 0, 8, 16, and 24. Element processor 0 is serially connected to element processors 1 through 7. Element processor 8 is serially connected to element processors 9 through 15. Element processor 16 is serially connected to element processors 17 through 23. Element processor 24 is serially connected to element processors 25 through 31.

Figure 4:
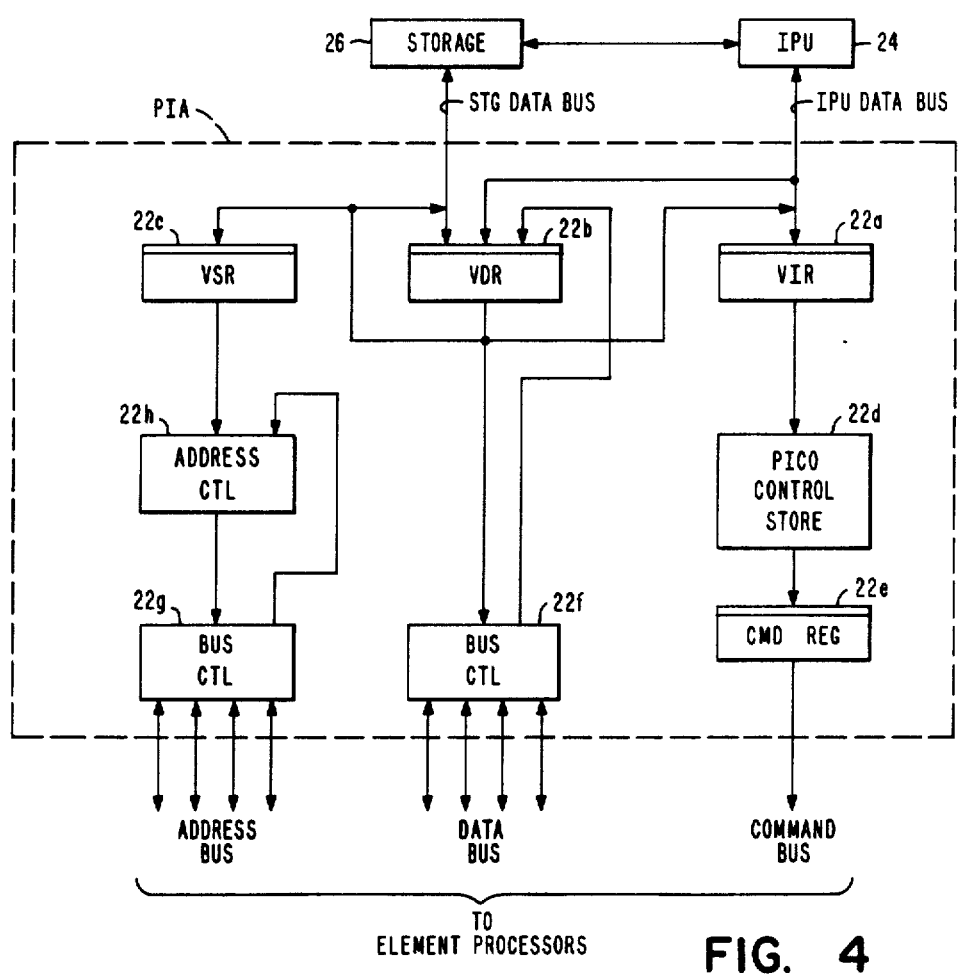
FIG. 4 illustrates the construction of the Processor Interface Adaptor of FIGS. 2 and 3.

Referring to FIG. 4, the construction of the PIA 22 is illustrated. The PIA 22 includes a vector instruction register (VIR) 22a connected to the IPU 24 for receiving a vector instruction from the IPU and temporarily storing the vector instruction. A vector data register (VDR) 22b is connected to storage 26 and to the IPU 24 for receiving data from storage 26 and temporarily storing the data. A vector status register (VSR) 22c is connected to the storage 26 and to IPU 24 for receiving address control information from storage and for temporarily storing the information. A pico control store 22d is connected to the VIR 22a for decoding the vector instruction stored in the VIR 22a and for selecting a pico control routine stored in the store 22d. A command register 22e is connected to the pico control store 22d and to the element processors via a command bus for driving the element processors. A bus control 22f is connected to the VDR 22b for receiving data from the VDR 22b and transmitting the data to the element processors 20 via a data bus. The bus control 22f can also steer data from one element processor to another element processor. The VSR 22c is also connected to a bus control 22g via an address control 22h. The address control 22h generates addresses corresponding to the data received from the VSR 22c. The bus control 22g transmits the generated addresses to the element processors 20 via an address bus.

The functional operation of the parallel vector processor of FIG. 2 will now be described with reference to FIGS. 2 through 4 of the drawings.

The IPU 24 instructs the PIA 22 to load specific data into vector registers VR0 and VR15. The IPU 24 transmits a LOAD instruction to the PIA 22. The LOAD instruction is temporarily stored in the VIR 22a. The DATA to be loaded into the vector registers VR0 and VR15 is stored in storage 26. When the PIA receives the LOAD instruction, it retrieves specific data from storage 26 and loads said data into the VDR 22b. Previous to the issuance of the LOAD instruction, the IPU 24 loaded address control information into the VSR 22c. As a result, specific address information is generated by the address control 22h. The address information comprises the address of selected element processors 20 into which the data is to be loaded and the address of selected elements associated with the selected element processors 20 into which the data is to be stored. The LOAD instruction, stored in the VIR 22a, is decoded by the pico control store 22d. Command information, corresponding to the LOAD instruction, stored in the pico control store 22d, is selected. In accordance with the address information generated by the address control 22h, the data stored in the VDR 22b is transmitted for storage in the selected processors 20 via the bus control 22f and a data bus. Furthermore, in accordance with the address information generated by the address control 22h, the command information stored in the pico control store 22d and selected by the decoded LOAD instruction, is transmitted to the selected processors 20 via command register 22e and a command bus. The selected command information causes the data stored in the selected processors to be loaded into the selected elements of the smaller registers 12a, the selected elements being identified by the address information generated by the address control 22h.

Accordingly, assume, by way of example, that a 128 element vector is stored in each of vector registers VR0 and VR15. An element comprises a four (4) byte binary word. Assume further that the following vector arithmetic operation is to be performed on the vectors stored in vector registers VR0 and VR15: VR0+VR15→VR15. The IPU 24 instructs the PIA 22 to perform an ADD operation wherein the vector stored in vector register VR0 is to be added to the vector stored in vector register VR15, the results to be stored in vector register VR15. The IPU 24 transmits this ADD instruction to the PIA 22. The ADD instruction is temporarily stored in the VIR 22a. In accordance with the ADD instruction, particular command information stored in the store 22d is selected. As the ADD instruction is received by the PIA 22, the IPU 24 retrieves specific data from storage 26 representative of the addresses of the elements in the smaller registers undergoing the ADD operation and the address of the selected processors 20 which will perform the ADD operation. As a result, address information is generated by the address control 22h. The address information is transmitted to the selected processors 20 via the bus control 22g and an address bus. In accordance with this address information, the selected command information, selected from the pico control store 22d, instructs the selected processors 20 to retrieve the selected elements of its associated smaller register 12a corresponding to vector registers VR0 and VR15. When the elements are retrieved, the selected command information causes the selected processors 20 to execute the ADD instruction. For example, elements 0 through 3, associated with the vectors stored in vector registers VR0 and VR15, are received by element processor number 0. Element processor 0 adds the corresponding elements together, and, in accordance with the selected command information, stores the results of the addition operation in the corresponding locations of vector register VR15. That is, element 0 of vector register VR0 is added to element 0 of vector register VR15, and the sum is stored in the element 0 location of vector register VR15. Elements 1, 2, and 3 of vector registers VR0 and VR15 are similarly added together, the sums being stored in the element 1, 2, and 3 locations of vector register VR15. Elements 4, 5, 6, and 7, associated with vector registers VR0 and VR15, are processed by element processor 1, in the same manner as described above, the processing of these elements being performed simultaneously with the processing of elements 0, 1, 2, and 3. The remaining elements of the vectors, stored in vector registers VR0 and VR15, are processed by element processors 2 through 31, in groups of four elements each, simultaneously with the processing of elements 0 through 3 and elements 4 through 7 by element processors 0 and 1 respectively. As a result, the above referenced vector arithmetic operation, performed on the vectors stored in vector registers VR0 and VR15, is completed in the time required to process four elements of the vector, as compared to the time required to process 128 elements of the vector, typical of the conventional vector processor systems. Therefore, the parallel vector processor of the present invention represents an improvement over the conventional vector processor systems.

Figure 5:
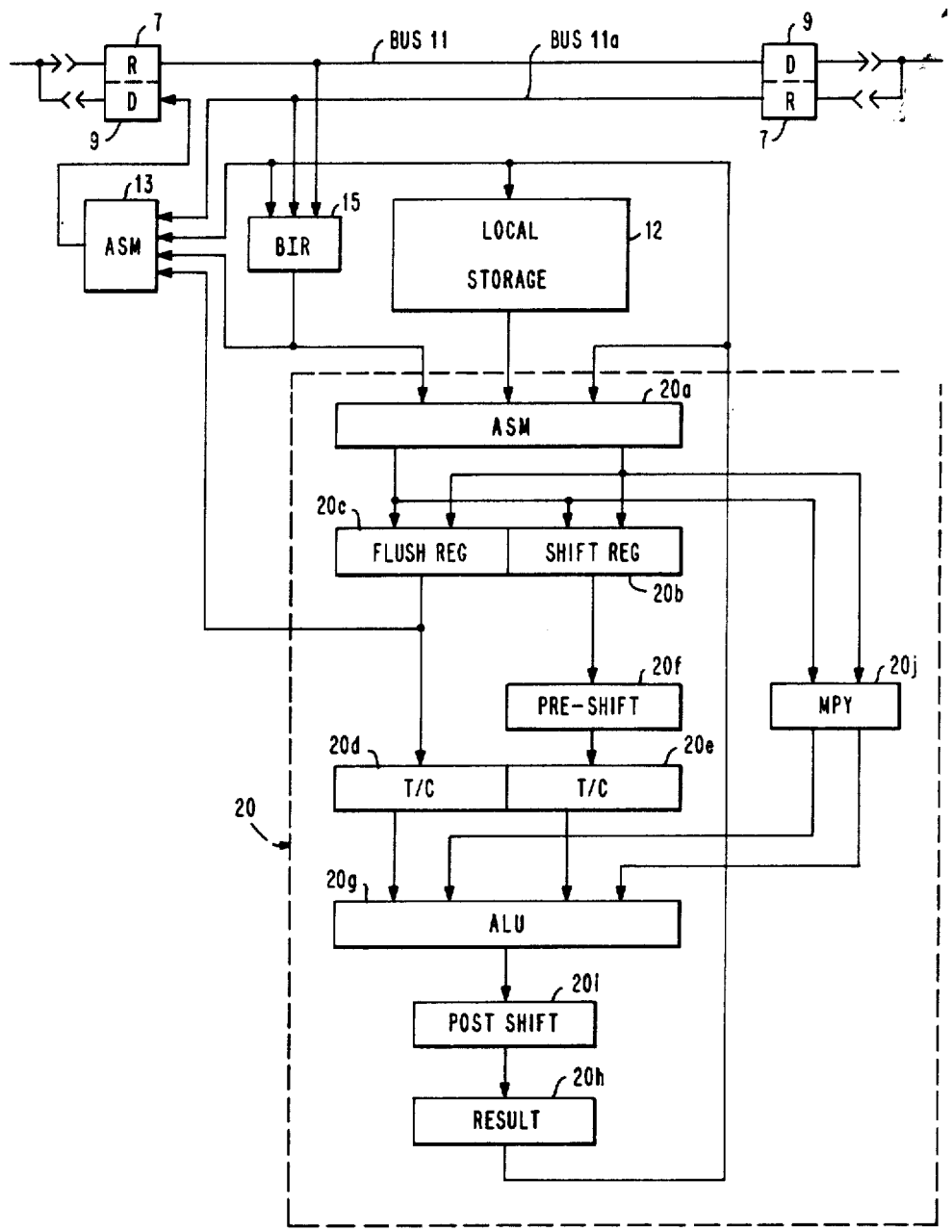
FIG. 5 illustrates a detailed construction of an element processor shown in FIGS. 2 and 3.

Referring to FIG. 5, a block diagram construction of an element processor 20 is illustrated. In FIG. 5, a local storage 12 is analogous to the vector registers 12 shown in FIG. 19 2 of the drawings. A system bus 11 and 11a is connected to a driver circuit 9 on one end and to a receiver circuit 7 on the other end. A first input data assembler (ASM) 13 is connected to a driver circuit 9 and to a receiver circuit 7. The ASM 13 is further connected to local storage 12 and to the element processor 20. The element processor 20 shown in FIG. 5 comprises a second input data assembler (ASM) 20a connected to the local storage 12 and to the first input data assembler 13. A Bus Interface Register (BIR) 15 is connected to bus 11 and bus 11a, on one end, and to the second input data assembler (ASM) 20a on the other end. A shift select register 20b and a flush select register 20c are connected to the input data assembler 20a. The flush select register 20c is connected directly to a trues/complement gate 20d whereas the shift select register 20b is connected to another trues/complement gates 36 via a pre-shifter control 20f. The trues/complements gates 20d and 20e are each connected to an operation means, such as an arithmetic logic unit (ALU) 20g. The ALU 20g is connected to a result register 20h via a post shifter control 20i, the result register 20h being connected to the local storage 12 for storing a result therein when the element processor 20 has completed an arithmetic processing operation on the four elements of a pair of vectors stored in a corresponding pair of vector registers 12. A multiplier circuit 20j is interconnected between the input data assembler 20a and the ALU 20g. Two operands are received by the multiplier circuit 20j. A sum output and a carry output is generated by the multiplier circuit 20j, the sum and carry outputs being received by the ALU 20g.

A description of the functional operation of an element processor 20 will be provided in the following paragraphs with reference to FIG. 5 of the drawings.

The functional operation of the element processor 20 shown in FIG. 5 may be subdivided into four cycles of operation: a read local storage and shift select cycle, alternatively known as a first cycle; a pre-normalize shift cycle, known as a second cycle; an ALU operation cycle, known as a third cycle; and a post-normalize shift cycle, known as a fourth cycle.

Utilizing the assumptions made previously, wherein the respective elements of vector registers VR0 and VR15 are added together and the results of the summation operation are stored in vector register VR0, elements 0 through 3 are received by receiver 7 of bus 11a and stored in local storage 12 via ASM 13, the local storage 12 being analogous to the first smaller register 12a shown in FIG. 2 which stores elements 0 through 3. Assume further that the elements 0 through 3 represent floating point element operands.

When a command is issued to add elements 0–3 stored in register VR0 to elements 0–3 stored in register VR15, on the first cycle, the operands of the respective elements are read from the local storage 12 and are temporarily stored in the flush register 20c and the shift register 20b via the input data assembler 20a. However, at the same time, the exponents of the respective elements enter an exponent control path (not shown) where the difference in magnitude of the exponents is calculated. Therefore, the element having the smaller exponent is gated to the shift select register 20b whereas the element having the greater exponent is gated to the flush select register 20c. The flush and shift select registers 20c and 20b are latched by a latch clock at the end of the first cycle.

At the beginning of the second cycle, a shift operation is started. The element having the greater exponent, stored in the flush select register 20c, is gated into one input of the arithmetic logic unit (ALU) 20g. Shift control information is passed from the exponent control path (not shown) to the pre-shifter 20f wherein the shift select register 20b, is right-shifted by the pre-shifter 20f to align said element with the element having the greater exponent, which is currently being gated into the one input of the ALU 20g. Concurrently, the ALU 20g is selecting the appropriate inputs from the trues/-complement gates 20d and 20e for receiving the elements from the flush and shift select registers 20c and 20b via the trues/complement gates 20d and 20e, respectively.

The third cycle, in the operation of the element processor 20 of FIG. 5, is dedicated to the functional operation of the arithmetic logic unit (ALU) 20g. The ALU is an 8-byte high speed carry look ahead adder, designed with 1's complement arithmetic and with end around carry and recomplementation. The ALU performs an addition operation, wherein the bits of four respective elements, in the example, elements 0 through 3 stored in one of the smaller registers 12a, associated with vector register VR0, are added to the bits of four respective elements, associated with vector register VR15. The results of the addition operation are ultimately stored in the local storage 12 (in the example, analogous to the vector register VR0 illustrated in FIG. 2). However, prior to this step, a post-normalization step must take place during the fourth cycle.

When the addition operation is completed by the ALU 20g, a post-normalization step takes place during the fourth cycle. The term "post-normalization", in data processing terms, comprises the steps of detecting leading zero hexadecimal digits in the results produced by the ALU, and left shifting the results in accordance with the number of zero digits detected. The results exponent must be adjusted by decrementing the exponent by a value of 1 for each digit shifted. Digits of the output of the ALU 20g are examined by the post shifter 20i for their zero state, and the results of the ALU output are left shifted in accordance with the number of zero digits detected. The left shifted results of the ALU output are passed to the result register 20h for temporary storage therein. The exponent control path (not shown) increments or decrements the exponent value of the result element (output from the ALU) so that a correct final exponent value is gated to the result register 20h. As a result, a result element is stored in the result register 20h, the operand of which is left shifted a proper amount in accordance with the number of zero digits detected in the ALU output, the exponent of which is the correct final exponent value. During the next cycle, following the fourth cycle, the result element is passed to the local storage 12 for storage therein (the local storage being analogous to one of the smaller registers 12a of FIG. 2, in the example, the smaller register 12a which stores elements 0 through 3).

Therefore, the performance of a vector processor is improved by virtue of the utilization of the concepts of the present invention. Although an increased number of circuits is necessary to implement the present invention, this increased number of circuits is economically justifiable as a result of the utilization of very large scale integrated circuit (VLSI) technology.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A vector processor, comprising:
   a plurality of vector registering means, each of said vector register means storing a vector, said vector including a plurality of elements, each of said vector register means including a plurality of smaller registers, each of said smaller registers storing one or more elements of said vector, the number of said one or more elements in said smaller registers being less than the number of said plurality of elements; and
   a plurality of element processor means connected, respectively, to said plurality of smaller registers of said plurality of vector register means,
   said one or more elements of each smaller register comprising a plurality of individual elements sequentially labelled from a first element to a last element,
   said plurality of element processor means retrieving, in parallel, corresponding ones of said plurality of individual elements from each of said smaller registers of a one said vector register means and from each of said smaller registers of another said vector register means,
   said plurality of element processor means performing a processing operation on the corresponding ones of said plurality of individual elements retrieved, in parallel, from each of said smaller registers of said one of said vector register means and said another of said vector register means thereby producing a set of results, said set of results being stored in one of said plurality of vector register means.
2. The vector processor of claim 1, wherein:
   the corresponding ones of said plurality of individual elements are retrieved by the plurality of element processor means from each of said smaller registers simultaneously and in parallel; and
   a said processor means sequentially retrieves said individual elements from a said smaller register beginning with said first element and ending with said last element.
3. A vector processor according to claim 2 further comprising:
   instruction storage means for storing a set of instructions;
   data storage means for storing a set of data information and a set of address information;
   control means connected to the instruction storage means, to the data storage means, and to the element processor means for receiving an instruction from said instruction storage means, said data information from the data storage means and said address information from said data storage means and for controlling an execution of said instruction and thereby said processing operation performed by said element processor means utilizing said data information and said address information retrieved from the data storage means.
4. A vector processor according to claim 3 wherein said element processor means comprises:
   read means for reading said one or more of said elements of said vector stored in said one of said vector register means and said one or more of said elements of said vector stored in said another of said vector register means;
   register means connected to said read means for storing said one or more of said elements of the vectors read from the vector register means by said read means, said one or more of said elements including operands;
   pre-shift means connected to the register means for shifting the operands associated with the elements of the vector stored in said one of said vector regis- ter means to align said operands with the operands associated with the elements of the vector stored in another of said vector register means;

operation means connected to the pre-shift means for processing the one or more of said elements of the vectors stored in said one of said vector register means and said another of said vector register means;

post-shift means connected to the operation means for receiving a set of results from said operation means and shifting the results a predetermined amount; and post operation storage means for storing the set of results, the set of results being passed to one of the plurality of vector register means for storage therein.

5. A vector processor, comprising:

a first vector register means for storing a first vector therein, said first vector comprising M elements, said first vector register means including a plurality of smaller register means for storing N of said M elements therein, where N is less than M;

a second vector register means for storing a second vector therein, said second vector comprising M elements, said second vector register means including a plurality of smaller register means for storing said N of said M elements therein; and a plurality of processor means connected, respectively, to said plurality of smaller register means of said first and second vector register means, said plurality of processor means being connected to an input of each of said vector register means, the N elements of each smaller register means comprising a plurality of individual elements sequentially labelled from a first element to a last element, said plurality of processor means simultaneously retrieving, in parallel, corresponding ones of said plurality of individual elements from each of said smaller register means of said first vector register means and said second vector register means, a said processor means sequentially retrieving said individual elements from said smaller register means beginning with said first element and ending with said last element, said plurality of processor means performing a processing operation on said corresponding ones of said plurality of individual elements retrieved from said first vector register means and said corresponding ones of said plurality of individual elements retrieved from said second vector register means thereby producing a set of results, and storing said set of results.

6. A parallel vector processor for performing an arithmetic operation on a first vector and a second vector thereby producing a set of results and for storing the results of said operation, comprising:

a plurality of vector register means, each of the vector register means storing an M element vector, each of said plurality of vector register means being subdivided into a plurality of smaller registers, each of the smaller registers storing N elements of said M element vector where N is less than M; and a plurality of processors connected, respectively, to the plurality of smaller registers of said plurality of vector register means for receiving the elements of said first vector stored in the smaller registers of one of said vector register means and the elements of said second vector stored in the smaller registers of another of said vector register means, arithmetically operating on said elements of said first vector and said second vector thereby producing said set of results, and storing said results in one of said vector register means, the N element vector in each of the smaller registers comprising a plurality of individual elements sequentially labelled from a first element to a last element, said plurality of processors receiving the elements of said first vector and the elements of said second vector by retrieving, in parallel, corresponding ones of said plurality of individual elements from each of said smaller registers of said one of said vector register means and said another of said vector register means, a processor sequentially retrieving said individual elements from a smaller register beginning with said first element and ending with said last element.

7. A parallel vector processor, comprising:

a plurality of vector registers, each of said vector registers comprising a plurality of smaller registers, said smaller registers having inputs and outputs; and a plurality of processors corresponding in number to the plurality of smaller registers of each of said plurality of vector registers, said plurality of processors having inputs which are connected, respectively, to the outputs of the said plurality of smaller registers and having outputs which are connected to the inputs of said plurality of smaller registers, each of said plurality of vector registers having an M element vector stored therein, each of the smaller registers of each vector register having N elements of said M element vector stored therein, where N is less than M, said plurality of processors simultaneously retrieving, in parallel, corresponding elements of the N element vector stored in each smaller register in a first vector register and corresponding elements of the N element vector stored in each smaller register in a second vector register, and processing the corresponding elements of each smaller register of the first vector register and the corresponding elements of each smaller register of the second vector register thereby producing a set of results and storing said results in one of said vector registers.

8. The parallel vector processor of claim 7, wherein:

a processor of said plurality of processors sequentially retrieves each of the elements of the N element vector stored in a smaller register beginning with a first element of the N element vector and ending with a last element of the N element vector.

* * * * *